United States Patent
Malmborg

[11] Patent Number: 5,953,785
[45] Date of Patent: Sep. 21, 1999

[54] SPOUT CLEANING DEVICE

[76] Inventor: Patti Malmborg, 407 King Ave., East Dundee, Ill. 60118

[21] Appl. No.: 08/561,463

[22] Filed: Nov. 21, 1995

[51] Int. Cl.$^6$ ..................................................... A47L 13/12
[52] U.S. Cl. ............................... 15/244.1; 15/245; 15/121
[58] Field of Search ................................. 15/244.1, 245, 15/121

[56] References Cited

U.S. PATENT DOCUMENTS

| | | | |
|---|---|---|---|
| 1,978,633 | 10/1934 | Horton et al. | 15/244.1 |
| 2,065,886 | 12/1936 | Cliff | 15/245 |
| 2,715,745 | 8/1955 | Jacobsen | 15/121 |
| 2,900,656 | 8/1959 | Tupper | 15/245 |
| 4,887,994 | 12/1989 | Bedford | 15/244.1 |
| 5,214,820 | 6/1993 | Shumway et al. | 15/244.1 |
| 5,519,911 | 5/1996 | Callander | 15/245 |

Primary Examiner—James F. Hook
Attorney, Agent, or Firm—Douglas B. white

[57] ABSTRACT

This spout cleaning tool presents a sponge-like foam rubber tip on a flat handle for cleaning a spout. In the preferred embodiment this tip is tapered and provides opposing flat sides, a rounded side, and a hard abrading edge. Additionally, this device is produced by first adhering a tapered foam rubber member around the extremity of a handle. Then, through the application of heat and pressure, a hard edge is formed while sealing the adjoining edges of the foam member.

5 Claims, 2 Drawing Sheets

SPOUT CLEANING DEVICE

BACKGROUND OF THE INVENTION

1. Field of the Invention

The present invention relates generally to devices and tools for cleaning, and more particularly to products used for cleaning or washing dishes.

2. Description of the Prior Art

Spouts, particularly of the type used on infant cups, have long posed a cleaning problem. Due to their size and shape they are difficult and time consuming to clean. This is especially true for crevices formed in the spouts, and a pick or small knife often needs to be employed to adequately clean them.

SUMMARY OF THE INVENTION

The spout cleaning device described herein presents a tapered sponge-like foam rubber tip affixed to a flat handle. In a preferred embodiment this tip is formed to provide opposing flat sides and a rounded side. Additionally, a hard edge is provided for abrading material in the crevices of the spout.

This unique device is efficiently produced by first adhering a tapered foam rubber member around the extremity of a handle. Then, through the application of heat and pressure, a hard edge is formed while sealing the adjoining edges of the foam rubber member.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
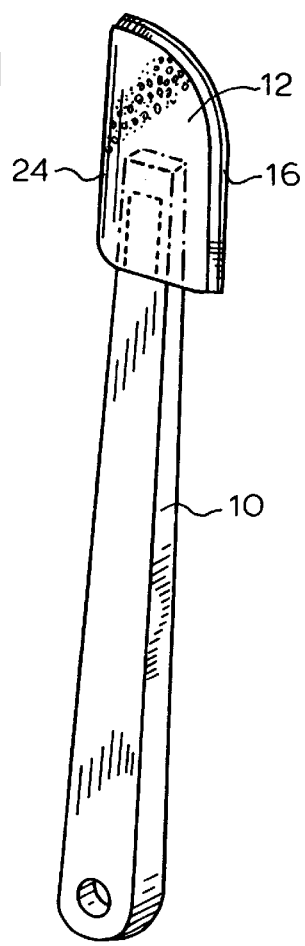
FIG. 1 is a perspective of the spout cleaning device of the present invention.

Turning first to FIG. 1 there is shown the spout cleaning device of the present invention having an elongated handle 10 with two extremities defined thereon and a substantially planar sponge-like tip member 12, exhibiting opposing broad sides and opposing narrow sides, mounted to an extremity of the handle along a center axis of the tip member. In the preferred embodiment this tip member is composed of a foam rubber material projecting from the handle and tapering from the handle towards the free tip extremity. Centrally positioned along one narrow side of the tip member, a curved hard edge 16 defines the taper of the tip member.

Figure 2:
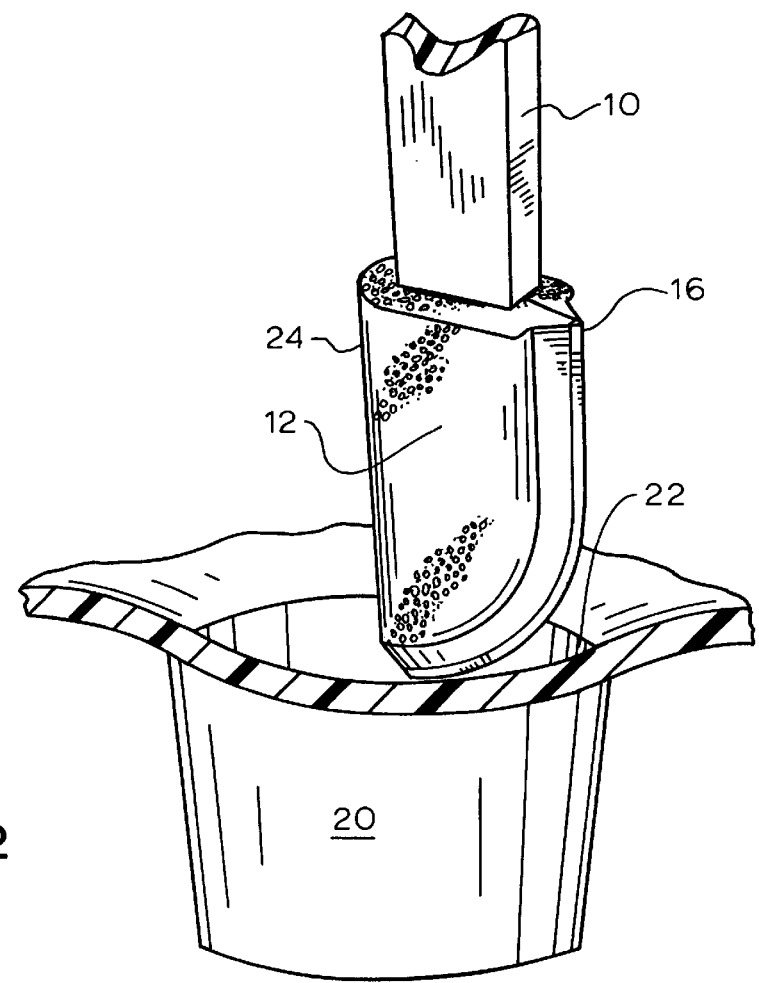
FIG. 2 is a perspective of the tip portion of the device of FIG. 1 shown poised for insertion into a spout having crevices.
Figure 3:
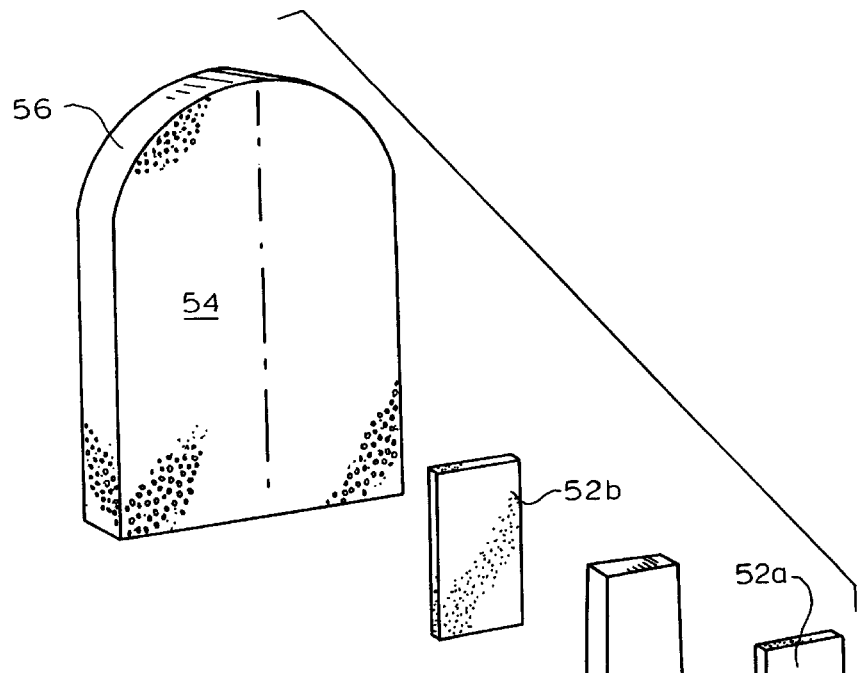
FIG. 3 is an exploded view of the device of FIG. 1 in preparation for assembly.

FIG. 2 depicts the spout cleaning tool of the present invention poised for insertion into a spout 20. The sponge-like tip member 12 acts to convey an operative cleaning liquid, such as soapy water, into the spout while the internal surface of the spout is scrubbed by this tip member. Most importantly, material adhered within the crevice 22 is easily dislodged with the curved hard abrading edge 16 and can be brushed out by use of the rounded opposite side 24. The broader flat sides of this device are used to generally scrub the broad sides of the spout.

The method of manufacture of this device is illustrated in FIG. 3 and FIGS. 4a–4c. An elongated flat handle 50 employs adhesive 52a and 52b near its extremity to affix a tip member 54 composed of a sponge-like foam rubber. This tip member exhibits curved sides 56 to yield a curved taper toward the free extremity of the tip.

Figure 4A:
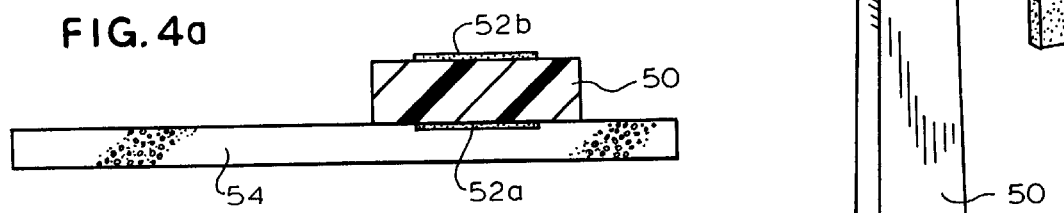
FIGS. 4a–4c are cross sectional views of the tip of the device showing the assembly sequence.
Figure 4B:
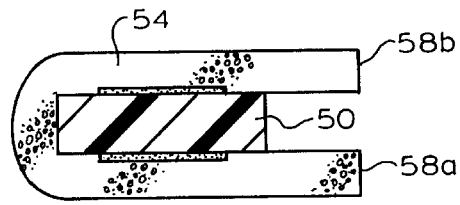
Figure 4C:
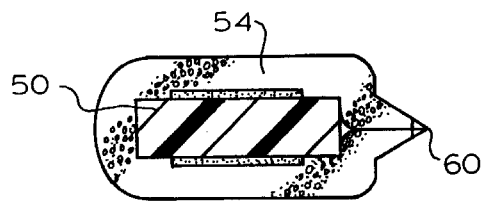

Assembly of this spout cleaning device is accomplished by first applying the adhesive to the handle and then wrapping the foam rubber tip member 54 around the handle extremity, as shown in FIGS. 4a and 4b. Finally, the free adjoining edges 58a and 58b of the tip member are compressed together and heated to seal and transform them into a unified hardened abrading edge 60.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A spout cleaning device comprising:
    an elongated handle member having two extremities defined thereon;
    a substantially planar sponge-like tip member exhibiting opposing broad sides and opposing narrow sides thereon, attached along a center axis to one of said two extremities of said handle member; and
    a hard edge centrally positioned along one of said narrow sides of said tip member.

2. The spout cleaning device of claim 1 wherein said handle member is a substantially flat elongated member.

3. The spout cleaning device of claim 2 wherein said tip member exhibits a taper.

4. The spout cleaning device of claim 3 wherein said taper is defined by a curvature of said hard edge.

5. The spout cleaning device of claim 4 further comprising a rounded side opposite said hard edge.

* * * * *